United States Patent [19]

Schmid et al.

[11] Patent Number: 5,026,199
[45] Date of Patent: Jun. 25, 1991

[54] RELEASABLE CONNECTION OF TUBULAR SLIDING RODS OF A TEXTILE MACHINE

[75] Inventors: Reinhold Schmid; Hans-Willi Esser, both of Monchen-Gladbach; Friedhelm Mistler, Wegberg, all of Fed. Rep. of Germany

[73] Assignee: W. Schlafhorst AG & Co., Monchen-Gladbach, Fed. Rep. of Germany

[21] Appl. No.: 337,557

[22] Filed: Apr. 12, 1989

[30] Foreign Application Priority Data

Apr. 15, 1988 [DE] Fed. Rep. of Germany ....... 3812493

[51] Int. Cl.⁵ .............................................. F16B 7/04
[52] U.S. Cl. .................................. 403/313; 403/312; 403/305; 403/293
[58] Field of Search ............... 403/305, 312, 306, 313, 403/293, 292, 309, 308

[56] References Cited

U.S. PATENT DOCUMENTS

| | | | |
|---|---|---|---|
| 2,806,724 | 9/1957 | Anspach et al. | 403/305 |
| 3,554,583 | 1/1971 | Lowe | 403/313 X |
| 3,679,250 | 7/1972 | Marsden | 403/313 |
| 3,707,304 | 12/1972 | Gostling | 403/293 |
| 3,851,983 | 12/1974 | MacKenzie | 403/312 |
| 3,926,531 | 12/1975 | Gostling | 403/293 |
| 4,008,972 | 2/1977 | Lindberg . | |
| 4,068,965 | 1/1978 | Lichti | 403/313 |
| 4,217,061 | 8/1980 | Eiland et al. | 403/313 |
| 4,398,841 | 8/1983 | Kojima et al. . | |

FOREIGN PATENT DOCUMENTS

| | | | |
|---|---|---|---|
| 166328 | 3/1905 | Fed. Rep. of Germany . | |
| 444959 | 4/1925 | Fed. Rep. of Germany . | |
| 801355 | 11/1950 | Fed. Rep. of Germany | 403/293 |
| 1818598 | 9/1960 | Fed. Rep. of Germany . | |
| 1969380 | 9/1967 | Fed. Rep. of Germany . | |
| 2142032 | 4/1972 | Fed. Rep. of Germany . | |
| 7920719 | 1/1981 | Fed. Rep. of Germany . | |
| 8503837 | 5/1985 | Fed. Rep. of Germany . | |
| 259194 | 6/1949 | Switzerland . | |
| 432588 | 7/1935 | United Kingdom . | |

Primary Examiner—Peter M. Cuomo
Attorney, Agent, or Firm—Herbert L. Lerner; Laurence A. Greenberg

[57] ABSTRACT

A releasable connection for tubular metal sliding rods with ends in a textile machine includes at least one pressureproof insert filling the rod ends. A metal clamping socket fits flush over the rod ends for transmitting force. The metal clamping socket has releasable clamping screws holding the rod ends in slide-free contact with the at least one insert and the clamping socket under changing loads.

17 Claims, 1 Drawing Sheet

U.S. Patent — June 25, 1991 — 5,026,199
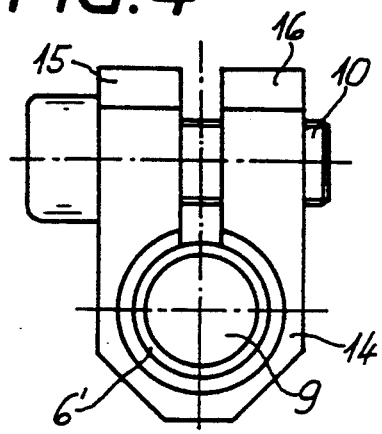
FIG.1
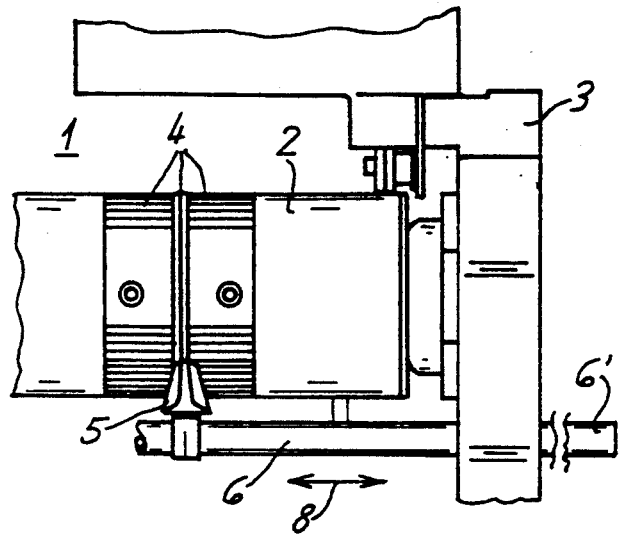
FIG.4
FIG.3
FIG.2

RELEASABLE CONNECTION OF TUBULAR SLIDING RODS OF A TEXTILE MACHINE

BACKGROUND OF THE INVENTION

The invention relates to a releasable connection of tubular metal sliding rods of a textile machine, in particular yarn guide rods.

Sliding rods are used, for instance, for yarn shogging, traversing or jigging devices on textile machines, such as automatic spinning reelers, winders or quillers, that produce cross-wound bobbins or cheeses. They are used to control the reciprocating yarn guide of one entire side of the machine and not infrequently are 20 to 25 meters long. Given such a length, the textile machine and thus the sliding rod necessarily include machine units in line with one another and attached to one another at the installation site. Each individual rod section is therefore only a few meters long. The rod sections are coupled to one another, and the coupling locations are critical points in the machine. The rod connection must be releasable, it must be secure against jarring and the sliding rods must not become loose and must not change in length from creepage of material during an arbitrarily high number of hours in operation. Naturally, the connection must be sufficiently firm.

SUMMARY OF THE INVENTION

It is accordingly an object of the invention to provide a releasable connection of tubular sliding rods of a textile machine, which overcomes the hereinafore-mentioned disadvantages of the heretofore-known devices of this general type and which provides a secure, economical connection of the sliding rod that is adaptable to situations in which space is restricted.

With the foregoing and other objects in view there is provided, in accordance with the invention, a releasable connection for tubular metal sliding rods, such as yarn guide rods with ends, in a textile machine, comprising at least one pressureproof insert filling the rod ends, and a metal clamping socket fitting flush over both of the rod ends for transmitting force, the metal clamping socket having releasable clamping screws holding the rod ends in slide-free and preferably frictional contact with the at least one insert and the clamping socket under changing loads.

It is characteristic of the clamping socket that it encompasses the ends of the rods and has two fin-like ends on one side only, which are pressed together by the clamping screws. In the compressed state, the fin-like ends need not necessarily touch one another. The clamping socket encompasses the rod ends at an angle on the order of 300°, for example, and upon being pressed together, the rod ends are fastened in place between the insert and the clamping socket over the same angle, with quite uniform force distribution.

Upon disassembly, once the clamping screws are loosened, the clamping socket can be displaced along the sliding rod. If necessary, the fin-like ends of the clamping socket can be resiliently spread apart somewhat by a simple tool, such as a screwdriver.

One insert may be common to both rod ends of the connection. In that case it is in a position to transmit forces in the sliding direction. However, in accordance with another feature of the invention, the at least one insert is in the form of two inserts, each being disposed in a respective one of the rod ends. In each case, it is the clamping socket alone that transmits forces in the sliding direction of the rods. To that end, however, the insert may optionally enter into a firm connection with the rod end. A further advantage in such a case is simpler assembly and disassembly.

In accordance with a further feature of the invention, the at least one insert has a smooth surface. This is particularly advantageous if an occasional disassembly of the insert is expected, or if the insert extends continuously from one sliding rod to the next.

In accordance with an added feature of the invention, the at least one insert, or one of two inserts, is inserted into the end of one of the tubular sliding rods with a sliding fit. A characteristic feature of the sliding fit or sliding seat is that it can be effected manually. A suitable sliding seat is, for instance, the fit H7/j6 defined by DIN 7157.

In accordance with an additional feature of the invention, the clamping socket has four of the clamping screws disposed in a row, two of the clamping screws holding one rod end and the other two holding another rod end. The nut thread of the clamping screws may, for instance, be located in one of the fin-like ends of the clamping socket.

In accordance with yet another feature of the invention, the rod ends are mutually spaced apart in the clamping socket at a given location, and the clamping socket has an inspection and assembly opening formed therein at the given location. A spacing apart of the rods from one another of a magnitude of from one to several millimeters, in combination with the inspection or assembly opening facing the given location, makes it possible to adjust the length upon assembly and to release the sliding rods in the course of disassembly. A simple tool, such as a wedge or screwdriver, can be pressed between the rod ends through the opening, in order to effect the length adjustment or to reinforce the release of the rod ends from the clamping socket.

In accordance with yet a further feature of the invention, the sliding rods have an outside diameter of approximately 10 mm, and the clamping screws are standardized M6 screws of grade 8.8 strength according to DIN-ISO. Steel pipes of high strength having dimensions of 10 times 1 millimeter have already proved themselves as sliding rods in automatic spinning reelers.

In accordance with yet an added feature of the invention, the tubular sliding rods and the at least one insert have surfaces, or are formed of materials, with a low chemical affinity for one another. This provision is made to prevent "seizing" of the inserts in the slide rods.

In accordance with yet an additional feature of the invention, the at least one insert is formed of hardened steel, and the clamping sockets are formed of quenched and subsequently drawn steel, or the at least one insert is formed of carbonitride steel, and the clamping sockets are of hardened steel. The first combination of materials is considered particularly advantageous.

In accordance with a concomitant feature of the invention, the at least one insert is nickel-plated or chromium-plated.

Other features which are considered as characteristic for the invention are set forth in the appended claims.

Although the invention is illustrated and described herein as embodied in a releasable connection of tubular sliding rods of a textile machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, side-elevational view of a built-in sliding rod at a winding station of an automatic spinning reeler: and FIGS. 2-4 are enlarged, top-plan, side-elevational and end-elevational views of a releasable connection of two sliding rods, with FIG. 3 being partially broken away.

DESCRIPTION OF THE PREFERRED EMBODIMENT

Referring to the figures of the drawing in detail and first, particularly, to FIG. 1 thereof, there is seen a friction drum 2 which is rotatably supported in a machine frame 3 at a winding station 1 of an automatic spinning reeler, which is not shown in further detail. The friction drum, and particularly a friction lining 4 thereof, drives a non-illustrated cross-wound bobbin or cheese which is supplied with a non-illustrated yarn from below with the aid of a yarn guide 5. The yarn guide 5 is secured on a sliding yarn guide rod 6. The sliding yarn guide rod 6 is likewise supported in the machine frame 3. The sliding rod 6 is moved oscillatingly back and forth in the direction of an arrow 8 in the course of the winding operation.

The sliding rod 6 extends over ten identically constructed winding stations. At both ends, it adjoins adjacent sliding rods. FIG. 1 shows a right rod end 6', which is intended to enter into a releasable connection with a rod end 7' of an adjacent sliding rod 7, as shown in FIGS. 2 and 3. To this end, each of the two rod ends 6', 7' is provided with its own insert 9. Since the metal sliding rods are tubular in construction, the inserts 9 are substantially in the form of cylinders, as shown particularly in FIG. 3. The inserts 9 are introduced manually into the rod ends 6' and 7' with a sliding seat, in such a way that the ends thereof are flush with the rod ends.

The transmission of force takes place with the aid of a metal clamping socket 14 that fits flush over both rod ends 6', 7' and is provided with releasable clamping screws 10-13. As FIGS. 3 and 4 show, the clamping socket 14 has two fin-like ends 15 and 16. The end 16 has threaded holes disposed in a row for receiving the clamping screws 10-13. The other end merely has through bores for receiving the clamping screws, as shown particularly in FIG. 3. The clamping screws 10 and 11 are intended for retaining the rod end 6', while the clamping screws 12 and 13 are intended for retaining the rod end 7'. The rod ends 6', 7' are spaced apart in the clamping socket by a distance of approximately 2.5 mm from one another, as shown in FIGS. 2 and 3. At that location, the clamping socket 14 has an inspection or assembly opening 17.

FIGS. 2-4 show the connection on a larger scale. The connecting rods 6 and 7 have an outside diameter of 10 mm. Their wall thickness is 1 mm. They are made of high-strength steel and are chromium plated on the outer surfaces thereof. The clamping screws 10-13 are standardized M6 screws of grade 8.8 strength in accordance with DIN-ISO. The inserts 9 are of hardened steel. The clamping socket 14 is of quenched and drawn steel Deviating from what is shown in the drawing, the inserts 9 may be somewhat longer, and in particular they may protrude farther into the rod ends 6' or 7'. Alternatively, a single insert, which is inserted into both rod ends, may be used.

Whether this is more favorable must be decided from one case to another. The advantage of such a provision is a more favorable transmission of force, while the difficulties to be expected in disassembly argue against such a provision.

FIGS. 2-4 show a simple construction in which the clamping socket 14 encompasses the rod ends 6', 7' with the minimum possible thickness of material, and is bulkier only where the clamping screws 10-13 are located. In this way, during assembly the clamping socket can be rotated about the rod ends or disposed in such a way that the row of screws is located where it is does not impede operation, while the remaining parts of the clamping socket can be located out of the way of parts of the machine that come close to the sliding rod.

The novel connection is a particularly vibration-proof connection and is especially fixed against continuous vibration. It withstands long-term flexure and translational vibration.

The foregoing is a description corresponding in substance to German Application P 38 12 493.9, dated Apr. 15, 1988, the International priority of which is being claimed for the instant application, and which is hereby made part of this application. Any material discrepancies between the foregoing specification and the aforementioned corresponding German application are to be resolved in favor of the latter.

We claim:

1. Releasable connection for hollow tubular metal sliding yarn guide rods with ends in a textile machine, comprising at least one pressureproof solid insert being disposed within and completely filling the rod ends, and a metal clamping socket fitting flush over the rod ends for transmitting force, releasable clamping screws clamping said metal clamping socket for holding and frictionally engaging the rod ends in slide-free contact with said at least one insert and said clamping socket under changing loads.

2. Releasable connection according to claim 1, wherein said at least one insert is in the form of two inserts, each being disposed in a respective one of the rod ends.

3. Releasable connection according to claim 1, wherein said at least one insert has a smooth surface.

4. Releasable connection according to claim 1, wherein said at least one insert is inserted into the end of one of the tubular sliding rods with a sliding fit.

5. Releasable connection according to claim 1, wherein one of said inserts is inserted into the end of one of the tubular sliding rods with a sliding fit.

6. Releasable connection according to claim 1, wherein said clamping socket has four of said clamping screws disposed in a row, two of said clamping screws holding one rod end and the other two holding another rod end.

7. Releasable connection according to claim 1, wherein the rod ends are mutually spaced apart in said clamping socket at a given location, and said clamping socket has an inspection and assembly opening formed therein at said given location.

8. Releasable connection according to claim 1, wherein the sliding rods have an outside diameter of approximately 10 mm, and said clamping screws are standardized M6 screws of grade 8.8 strength according to DIN-ISO.

9. Releasable connection according to claim 1, wherein the tubular sliding rods and said at least one insert have surfaces with a low chemical affinity for one another.

10. Releasable connection according to claim 1, wherein the tubular sliding rods and said at least one insert are formed of materials with a low chemical affinity for one another.

11. Releasable connection according to claim 1, wherein said at least one insert is formed of hardened steel, and said clamping sockets are formed of quenched and subsequently drawn steel.

12. Releasable connection according to claim 1, wherein said at least one inset is formed of carbonitride steel, and said clamping sockets are of hardened steel.

13. Releasable connection according to claim 1, wherein said at least one insert is nickel-plated.

14. Releasable connection according to claim 1, wherein said at least one insert is chromium-plated.

15. Releasable connection according to claim 1, wherein said clamping screws are all disposed along one side of the rod ends.

16. Releasable connection according to claim 1, wherein said clamping socket encompasses the rod ends over an angle of at least 300°.

17. Combination of hollow tubular metal sliding yarn guide rods with ends in a textile machine and a releasable connection for the rods, the releasable connection comprising at least one pressureproof solid insert being disposed within and completely filling said rod ends, and a metal clamping socket fitting flush over said rod ends for transmitting force, releasable clamping screws clamping said metal clamping socket for holding and frictionally engaging said rod ends in slide-free contact with said at least one insert and said clamping socket under changing loads.

* * * * *